(12) United States Patent
Newberg et al.

(10) Patent No.: US 6,698,762 B2
(45) Date of Patent: Mar. 2, 2004

(54) ROTARY DEVICE SHAFT WITH OIL SLINGER GROOVE

(75) Inventors: Barry M. Newberg, Florissant, MO (US); Gary W. Borcherding, Florissant, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 10/192,258

(22) Filed: Jul. 10, 2002

(65) Prior Publication Data

US 2004/0007825 A1 Jan. 15, 2004

(51) Int. Cl.$^7$ ............................................. F16J 15/40
(52) U.S. Cl. ........................ 277/430; 277/409; 277/411; 277/423; 277/424; 277/429
(58) Field of Search ................................. 227/409, 411, 227/412, 418–420, 423, 424, 429, 430

(56) References Cited

U.S. PATENT DOCUMENTS

| | | | | |
|---|---|---|---|---|
| 1,708,044 A | * | 4/1929 | Baumann | 277/418 |
| 2,441,844 A | * | 5/1948 | Rhoads | 277/429 |
| 3,476,396 A | * | 11/1969 | Buhl | 277/430 |
| 3,614,112 A | * | 10/1971 | Herzog et al. | 277/429 |
| 4,010,960 A | * | 3/1977 | Martin | 277/563 |
| 4,531,746 A | * | 7/1985 | Amdall et al. | 277/347 |
| 5,308,087 A | * | 5/1994 | Schmitt | 277/351 |
| 6,460,656 B1 | * | 10/2002 | Jones et al. | 184/13.1 |

* cited by examiner

Primary Examiner—Anthony Knight
Assistant Examiner—Enoch E Peavey
(74) Attorney, Agent, or Firm—Thompson Coburn LLP

(57) ABSTRACT

A lubricant leakage stop is provided on the shaft of a rotary device in the form of an annular groove in the shaft. In one embodiment the annular groove is formed with an annular inner surface at the bottom of the groove and with an annular intermediate surface positioned between two portions of the annular inner surface. The intermediate surface has a larger diameter dimension than the two inner surface portions on the axially opposite sides of the intermediate surface. The intermediate surface also has a smaller diameter dimension than that of the two portions of the shaft outer surface on axially opposite sides of the groove. In a second embodiment, the annular groove is formed with an annular inner surface that tapers from the bottom of the groove outwardly to the outer surface of the shaft on one side of the groove. Any lubricant leakage axially along the shaft outer surface is stopped by the annular groove and is thrown by rotation of the shaft radially outwardly from the shaft intermediate surface to a lubricant reservoir surrounding the shaft. Each annular groove intersects the shaft outer surface at an annular, chamfered surfaces at one side of the groove. The reduced diameter of the shaft intermediate surface and the annular chamfered surface of the shaft allow component parts of the rotary device to be press fit over the groove without being damaged by the construction of the groove.

23 Claims, 3 Drawing Sheets

ROTARY DEVICE SHAFT WITH OIL SLINGER GROOVE

BACKGROUND OF THE INVENTION

1. Field of the Invention

The present invention pertains to a lubricant leakage stop employed with an electric motor. More specifically, the present invention pertains to an annular groove that is formed into the exterior surface of a horizontally oriented motor shaft just outside of a bearing assembly supporting the shaft but within the lubrication system surrounding the bearing assembly. In one embodiment the annular groove is formed with an annular inner surface at the bottom of the groove and with an annular intermediate surface positioned between two portions of the annular inner surface. The intermediate surface has a larger diameter dimension than the two inner surface portions of the groove on the axially opposite sides of the intermediate surface. The intermediate surface also has a smaller diameter dimension than that of the two outer surface portions of the shaft on axially opposite sides of the groove. In a second embodiment, the annular groove is formed with an annular inner surface that tapers from the bottom of the groove outwardly to the outer surface portion of the shaft on one side of the groove. Any lubricant leakage axially along the shaft is stopped by the annular groove and is thrown by rotation of the shaft radially outwardly from the intersection of the shaft outer surface and the groove of both embodiments, or from the intersection of the shaft intermediate surface and the groove in the first embodiment. The lubricant thrown radially outwardly by the shaft rotation is thrown to the fibrous, lubricant impregnated material of the bearing lubrication system that surrounds the shaft and the bearing supporting the shaft and is returned by the material to the bearing.

2. Description of the Related Art

Home appliance motors, for example electric motors used in electric household appliances like dishwashers, clothes washers, and clothes dryers, often have horizontally oriented rotating shafts that are typically mounted in sleeve bearings or porous sintered metal bearings where bearing surfaces support the shafts for rotation. The bearings are typically mounted in end shields of the electric motor housing. A bearing cap is mounted in the end shield shaft opening and surrounds the bearing and a lubricant-permeated fibrous material is packed inside the bearing cap surrounding the bearing.

The lubricant-permeated fibrous material provides a self-contained source of lubricant to the motor shaft bearings. The material is packed around the bearing, contacting the bearing exterior surface, and the lubricant permeating the material passes through the porous bearing to the bearing surface supporting the shaft for rotation. In this manner, lubricant is supplied to the interface of the shaft exterior surface and the bearing surface.

Because the bearing lubrication system described above is self-contained, loss of lubricant from a motor employing the lubrication system can have serious consequences on the motor's operational life. One of the major causes for sleeve bearing failures is loss of oil out of the bearing lubrication system. Sleeve bearings by design experience some oil leakage out of the motor along the shaft exterior surface that interfaces with the bearing surface of the bearing.

To combat this problem, annular obstructions have been positioned on the shaft adjacent the bearing, where the obstruction would stop the leakage of lubricant along the shaft and on rotation of the shaft would sling or throw the leaking lubricant radially outwardly toward the fibrous material packed around the shaft. Prior art annular obstructions employed on a motor shaft include a single annular groove formed in the shaft exterior surface, an annular neck formed on the shaft exterior surface, or a rubber washer positioned on the shaft exterior surface. However, none of these prior art methods for stopping oil leakage along the shaft were 100% effective. In addition, the annular groove shaft was disadvantaged in that the groove formed sharp annular corners at the shaft exterior surface on the axially opposite sides of the groove. These sharp annular corners could damage some parts that were press fit on the shaft over the groove, for example, plastic cooling fans and plastic thrust washers for the bearing assembly.

What is needed to overcome the disadvantages of prior art lubricant leakage stops discussed above is a lubricant leakage stop for a rotating shaft that reliably stops lubricant from leaking axially over the shaft exterior surface and does not damage component part of the rotary device that are press fit on the shaft and passed over the lubricant leakage stop.

SUMMARY OF THE INVENTION

The lubricant leakage stop of the present invention overcomes the shortcomings of the prior art leakage stops employed on horizontally oriented shafts by providing an annular groove on a shaft with a novel configuration that reliably stops lubricant leakage axially across the shaft exterior surface and does not damage component parts of a rotary device press fit on the shaft and passed over the annular groove.

The shaft of the invention has an axial length and a center axis of rotation extending between opposite first and second ends of the shaft. The electric rotary device, for example an electric motor, is mounted on an intermediate portion of the shaft between its opposite ends. The device is contained in a housing. A pair of bearings mounted in axially opposite ends of the housing support the shaft for rotation in the housing. The first end of the shaft projects axially from one of the bearings and the housing interior. The opposite second end of the shaft is typically mounted in the second bearing and is contained in the housing. However, if the second end of the shaft also projects from the housing interior, the lubricant leakage stop of the invention would be employed on both the first and second ends of the shaft.

In the illustrative embodiment of the invention, the lubricant leakage stop is employed only on the first end of the shaft. The stop is basically an annular groove of novel configuration formed in the exterior or outer surface of the shaft adjacent the bearing at that end of the shaft and inside the lubricant-permeated fibrous material of the bearing lubrication system. The annular groove is formed in the shaft where portions of the shaft outer surface on axially opposite sides of the groove have the same outer diameter dimension.

In a first embodiment, the groove of the lubrication stop is formed in the shaft with an annular shaft interior or inner surface at the bottom of the groove. On one axial side of the groove a first radial surface extends from the inner surface of the groove radially outwardly to the shaft outer surface. The first radial surface intersects the shaft outer surface at an annular, right angle corner. At the axially opposite end of the groove, a second radial surface extends from the groove inner surface radially outwardly to the shaft outer surface. The second radial surface intersects the shaft outer surface at an annular, chamfered corner.

An annular intermediate surface of the shaft is positioned in the groove, with portions of the groove inner surface"

positioned on axially opposite sides of the intermediate surface. The shaft intermediate surface has a diameter dimension that is larger than the diameter dimensions of the two portions of the groove inner surface on the axially opposite sides of the intermediate surface, but is smaller than the diameter dimension of the two portions of the shaft outer surface on the axially opposite sides of the groove. A third radial surface extends radially outwardly from the groove inner surface to the shaft intermediate surface and a fourth radial surface extends radially outwardly from the groove inner surface to the shaft intermediate surface on axially opposite sides of the intermediate surface. Both the third and fourth radial surfaces intersect the shaft intermediate surface at an annular, right angle corner.

The shaft intermediate surface being positioned in the annular groove between two portions of the groove inner surface divides the groove into two groove sections, each positioned on an axially opposite side of the intermediate surface. The double groove sections of the lubricant leakage stop are more effective at stopping leakage from the motor along the shaft outer surface than the prior art annular groove. Any lubricant that leaks along the shaft outer surface and manages to cross the first groove section to the shaft intermediate surface is stopped from travelling axially along the shaft by the second groove section. The sharp, annular, right angle corners of the intermediate surface also function to sling or radially throw lubricant off the intermediate surface toward the lubricant-permeated fibrous material of the bearing lubrication assembly when the shaft is rotated.

Because the annular intermediate surface of the shaft has a smaller diameter than the diameter dimension of the shaft outer surface on opposite sides of the groove, component parts press fit over the shaft outer surface will pass over the shaft intermediate surface without being damaged by the sharp annular, right angle corners of the shaft intermediate surface. In addition, the component parts will pass over the annular groove and onto the shaft outer surface on the opposite side of the groove with the annular, chamfered corner at the opposite side of the groove preventing any damage to the component parts.

In a second embodiment, the groove of the lubrication stop is formed in the shaft by a pair of radial surfaces. On one axial side of the groove a first radial surface extends from the bottom of the groove radially outwardly to the shaft outer surface. The radial surface is perpendicular to the shaft center axis and intersects the shaft outer surface at an annular, right angle corner. At the axially opposite side of the groove, a second radial surface extends from the first radial surface at the bottom or interior of the groove radially outwardly to the shaft outer surface. The second radial surface has a tapered, curved or conical configuration that extends radially outwardly from the first radial surface as it extends axially away from the first radial surface. The second radial surface intersects the shaft outer surface forming an annular, chamfered corner. The interior or bottom of the groove is formed by the intersecting circular edges of the first radial surface and the second radial surface.

Any lubricant that leaks along the shaft outer surface is stopped from travelling axially along the shaft by the first radial surface of the groove. The sharp, annular, right angle corner of the intersection of the first radial surface with the shaft outer surface functions to sling or radially throw lubricant off the shaft toward the lubricant-permeated fibrous material of the bearing lubrication assembly when the shaft is rotated.

In addition, component parts press fit over the shaft outer surface will pass over the intersection of the first radial surface and the shaft outer surface without being damaged by the sharp, annular, right angle corner of the intersection. The component parts will pass over the annular groove and onto the shaft outer surface on the opposite side of the groove with the annular, chamfered corner between the second radial surface and the shaft outer surface at the opposite side of the groove preventing any damage to the component parts.

Thus, the lubricant leakage stops constructed as described above overcome the problem of lubricant leakage along the surface of a horizontally oriented shaft and the problem of damaging component parts of the electrical device that are press fit over the shaft and passed over the annular groove.

BRIEF DESCRIPTION OF THE DRAWINGS

Further features of the invention are revealed in the following detailed description of the preferred embodiment of the invention and in the following drawing figures wherein.

DETAILED DESCRIPTION OF THE PREFERRED EMBODIMENT

Figure 1:
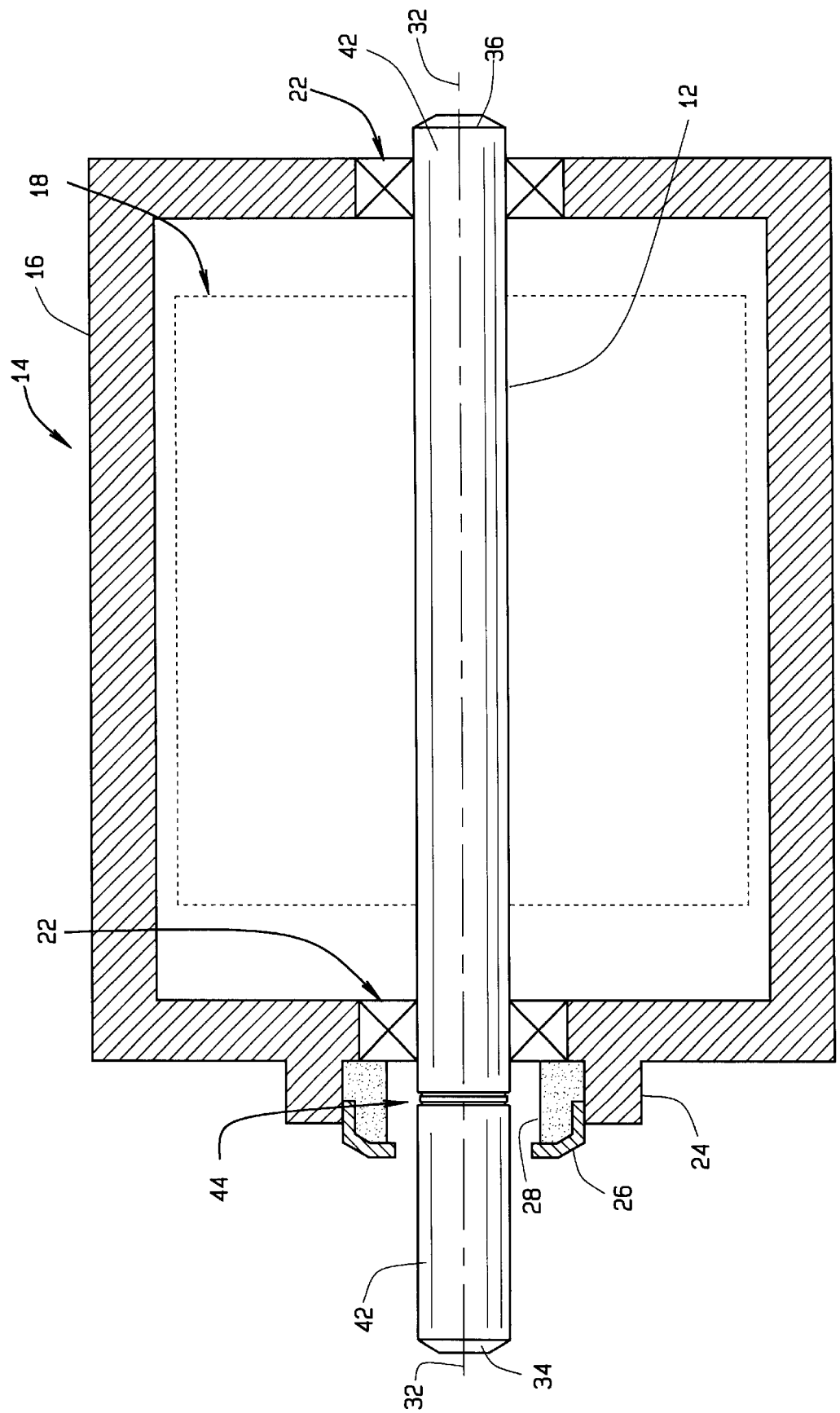
FIG. 1 is a plan view of an electrical rotary device shaft employing the lubricant leakage stop of the present invention.

FIG. 1 shows a shaft of an electrical device employing the lubricant leakage stop of the present invention. In the first illustrative embodiment of the invention shown in FIG. 1, the shaft (12) is a horizontally oriented shaft of an electric motor shown schematically in FIG. 1. It should be understood that the shaft (12) employing the lubricant leakage stop of the invention may be employed in other environments where the shaft is vertically oriented and/or the shaft is employed in a rotary device that is a source of lubricant leakage on the shaft. Because the electric motor (14) is only one example of a rotary device with which the shaft (12) employing the lubricant leakage stop of the invention may be employed, the motor (14) is shown only schematically in FIG. 1 and will be described only generally herein.

The rotary device or electric motor (14) comprises a motor housing (16) that encloses the stator and rotor of the motor depicted by the dashed lines (18) in FIG. 1. The shaft (12) is mounted to the motor housing (16) by a pair of bearing assemblies (22). An annular collar (24) is provided on an end shield of the motor housing (16) at the left end of the housing as shown in FIG. 1. The collar (24) contains a bearing cap (26). A lubricant permeated fibrous material (28) is contained in the bearing collar (26). The fibrous material (28) surrounds and is in contact with the bearing assembly (22) at the left end of the motor housing and functions as a source of lubricant to the bearing. Although not shown in FIG. 1, an annular collar, bearing cap and fibrous material may also surround the bearing assembly at the right end of the motor housing as shown in FIG. 1. However, as explained earlier, because the shaft (12) employing the lubricant leakage stop of the invention may be employed in a variety of different types of rotary devices, the example of the electric motor (14) of FIG. 1 is shown as a simplified schematic representation.

The shaft (12) of the invention has a center axis of rotation (32) and an axial length between opposite first (34) and second (36) ends of the shaft. The shaft center axis (32) defines mutually perpendicular axial and radial directions relative to the shaft (12), and the axial and radial directions are employed herein in describing the construction of the shaft. The shaft has an exterior or outer surface (42) that has a diameter dimension that is constant along the axial length of the shaft except for an annular groove (44) formed in the shaft outer surface. However, it is not necessary that the shaft have a constant outer surface diameter along its entire length, but in the preferred embodiment of the invention the shaft outer surface diameter is the same at least on axially opposite sides of the annular groove (44). The rotor and its surrounding stator depicted by the dashed lines (18) in FIG. 1 are mounted around an intermediate portion of the shaft (12) between the annular groove (44) and the shaft second end (36). The pair of bearings (22) mounted in axially opposite ends of the motor housing (16) are mounted on the shaft and support the shaft for rotation in the housing. As shown in FIG. 1, the pair of bearing assemblies (22) and the motor housing (16) are positioned relative to the shaft (12) between the annular groove (44) and the shaft second end (36) with the shaft first end (34) projecting axially from the bearings and the housing interior.

The first lubricant leakage stop of the invention is provided by the particular construction of the annular groove (44). As shown in FIG. 1, the source of lubricant leakage along the shaft (12) is the motor (14), more specifically the motor's bearing (22). The novel construction of the lubricant leakage stop annular groove (44) of the invention prevents lubricant from leaking along the shaft outer surface (44) from the motor (14) to the shaft first end (34) or to the left as viewed in FIG. 1. The annular groove (44) of the invention functions to stop lubricant leakage to the left along the shaft outer surface (42) and returns any leaking lubricant to the lubricant reservoir of the left hand bearing assembly (22) provided by the fibrous material (28) packed in the bearing cap (26).

Figure 2:
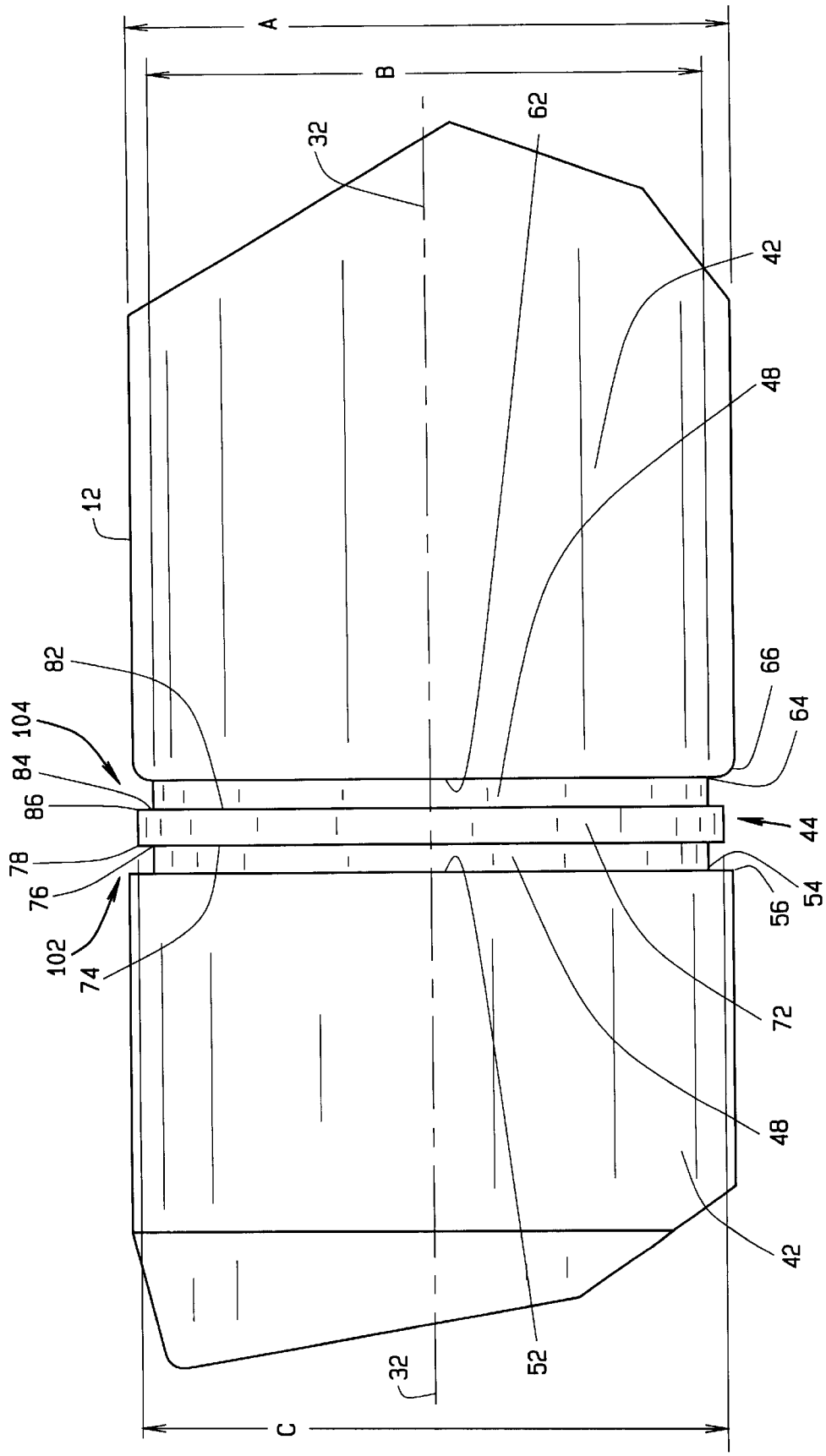
FIG. 2 is an enlarged partial view of the shaft of FIG. 1 showing the detail of the lubricant leakage stop of the invention; and, FIG. 3 is a view similar to FIG. 2 but showing the detail of a second embodiment of the lubricant leakage stop of the invention.

The detail of the construction of the lubricant leakage stop of the invention is shown in the partial, enlarged view of the shaft (12) in FIG. 2. FIG. 2 shows the details of the annular groove (44) formed in the shaft with the shaft first end (34) being to the left of the groove and the motor (14) and shaft second end (36) being to the right of the groove just as in FIG. 1.

As shown in FIG. 2, the portions of the shaft exterior surface or outer surface (42) on the axially opposite sides of the annular groove (44) have the same outer diameter dimensions (A). The two portions of the shaft outer surface (42) are cylindrical and are parallel with the shaft center axis (32). The groove (44) of the lubrication stop is formed in the shaft (12) with an annular interior or inner surface (48) at the bottom of the groove. The groove inner surface (48) is cylindrical and has a constant diameter dimension (B) and is parallel with the shaft center axis (32). On one axial side of the groove (44), the left side of the groove or the side adjacent the shaft first end (34) shown in FIG. 2, a first radial surface (52) extends from the inner surface (48) of the groove radially outwardly to the shaft outer surface (42). The first radial surface (52) intersects the groove inner surface (48) at an annular, right angle corner (54). The first radial surface (52) also intersects the shaft outer surface (42) at an annular, right angle corner (56).

At the axially opposite end of the groove (44), the right hand side of the groove or the side closest to the shaft second end (36) as viewed in FIG. 2, a second radial surface (62) extends from the groove inner surface (48) radially outwardly to the shaft outer surface (42). The second radial surface (62) intersects the groove inner surface (48) at an annular, right angle corner (64). The second radial surface (62) also intersects the shaft outer surface (42), but intersects the shaft outer surface at a chamfered surface (66) that extends around the shaft (12). The chamfered surface (66) forms an annular, chamfered corner at the intersection of the second radial surface (62) with the shaft outer surface (42).

The groove (44) is also formed in the shaft (12) with an annular, intermediate surface (72) of the shaft positioned in the groove. The intermediate surface (72) is cylindrical and parallel with the center axis (32). Portions of the groove inner surface (48) are positioned on axially opposite sides of the intermediate surface (72). The shaft intermediate surface (72) has a diameter dimension (C) that is larger than the diameter dimensions (B) of the two portions of the groove inner surface (48) on the axially opposite sides of the intermediate surface, but is smaller than the diameter dimension (A) of the two portions of the shaft outer surface (42) on the axially opposite sides of the groove (44).

A third radial surface (74) extends radially outwardly from the groove inner surface (48) to the shaft intermediate surface (72) on the left hand side of the shaft intermediate surface as viewed in FIG. 2. The third intermediate surface (72) intersects the groove inner surface (48) at an annular, right angle corner (76). The third radial surface (74) also intersects the shaft intermediate surface (72) at an annular, right angle corner (78).

A fourth radial surface (82) extends from the groove inner surface (48) radially outwardly to the shaft intermediate surface (72) on an axially opposite side of the shaft intermediate surface from the third radial surface (74). The fourth radial surface (82) is parallel to the third radial surface (74) and intersects the groove inner surface (48) at an annular right angle corner (48). The fourth radial surface (82) also intersects the shaft intermediate surface (72) at an annular, right angle corner (86).

With the construction of the annular groove (44) described above, the shaft outer surface (42) and intermediate surface (72) are parallel with the shaft center axis (32), and the shaft radial surfaces (52), (62), (74), (82) are all parallel to each other and perpendicular to the shaft center axis (32).

The shaft intermediate surface (72) positioned in the annular groove (42) between the two portions of the groove inner surface (48) divides the groove into two groove sections (102), (104). Each of the groove's sections (102), (104) is positioned on an axially opposite side of the intermediate surface (72). The double groove sections (102), (104) of the lubricant leakage stop are more effective in stopping leakage from the source of lubricant leakage, i.e. the electric motor (14) or motor bearing (22), along the shaft outer surface (42) than the prior art annular groove.

With the shaft (12) oriented horizontally as it is in the illustrative environment, lubricant leakage along the shaft outer surface (42) will eventually reach the groove section (104) to the right in FIG. 2. Should the lubricant leakage manage to cross the groove section (104) and reach the shaft intermediate surface (72), further leakage of the lubricant along the shaft to the left as viewed in FIG. 2 is stopped by the groove section (102) to the left of the intermediate surface (72) as shown in FIG. 2. Any lubricant that reaches the shaft intermediate surface (72) is thrown radially from the axially opposite annular, right corners (78), (86) of the surface toward the lubricant reservoir of the bearing assembly fibrous material (28) on rotation of the shaft.

Furthermore, the double groove sections (102), (104) of the lubricant leakage stop annular groove (44) are not merely a duplication of the single annular groove of the prior art. Because the shaft annular, intermediate surface (72) has a smaller diameter dimension (C) than the shaft outer surface diameter dimension (A), component parts of the rotary device, for example, plastic cooling fans, thrust washers or thrust sleeves can be passed over the annular groove (48) from left to right as shown in FIG. 2 without the sharp annular corner (78) of the intermediate surface (72) cutting into and damaging the component part. In addition, the chamfered surface (66) at the intersection of the annular groove (44) and the shaft outer surface (42) on the right side of the groove will allow the component parts to pass over the groove and onto the shaft exterior surface to the right of the groove with the chamfered corner surface (66) preventing any damage to the component parts.

Figure 3:
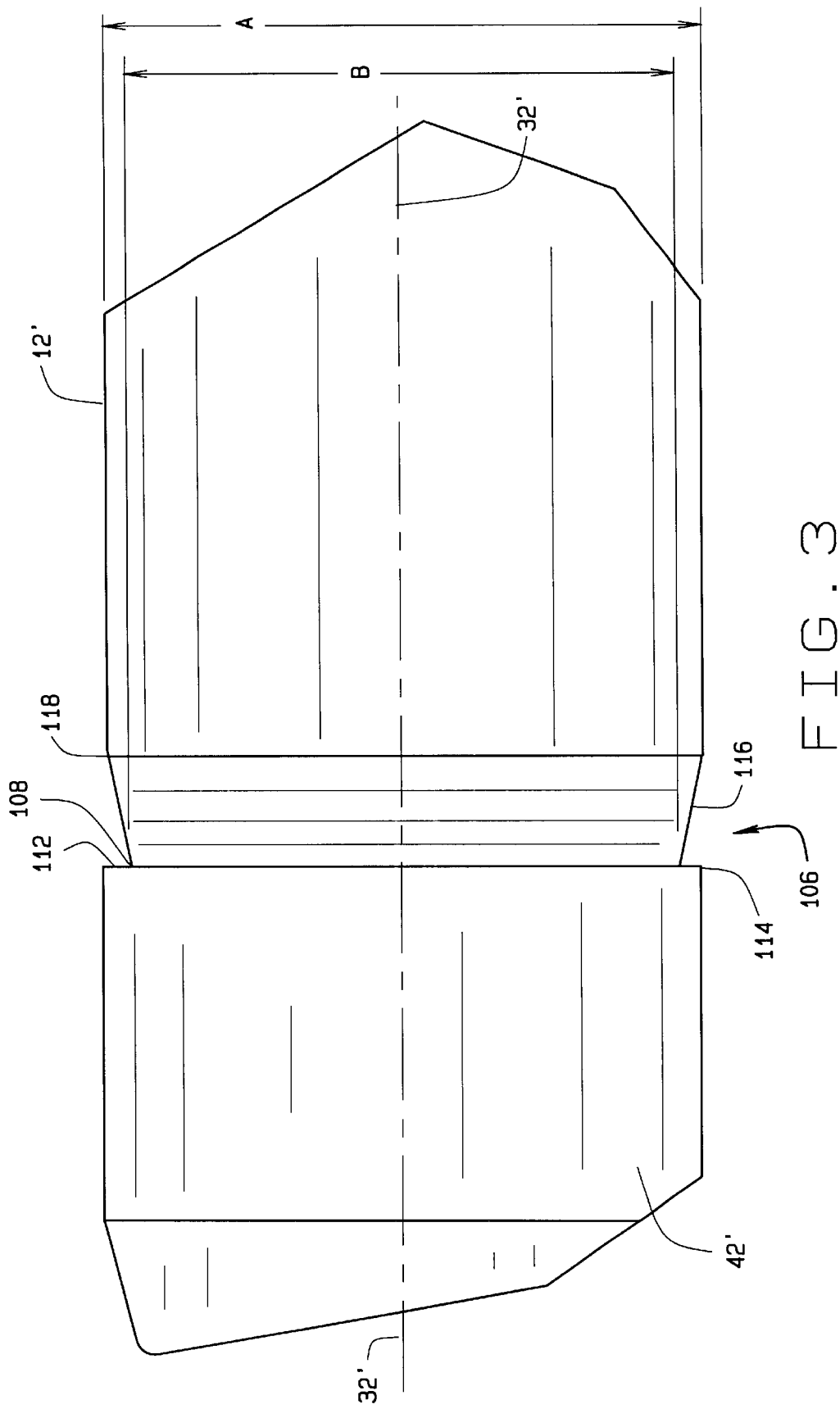

The detail of the construction of a second embodiment of the lubricant leakage stop of the invention is shown in the partial, enlarged view of the shaft in FIG. 3. Because the shaft shown in FIG. 3 is the same as that shown in FIGS. 1 and 2, the same reference numbers are employed in identifying the shaft (12'), the shaft center axis (32') and the shaft outer surface (42') with the reference numbers being followed by a prime ('). FIG. 3 shows the details of the second embodiment of the annular groove (106) formed in the shaft with the shaft first end being to the left of the groove in FIG. 3 and the shaft second end being to the right of the groove in FIG. 3, just as in FIG. 1.

As shown in FIG. 3, the portions of the shaft exterior surface or outer surface (42') on the axially opposite sides of the annular groove (106) have the same outer diameter dimensions (A). The two portions of the shaft outer surface (42') are cylindrical and are parallel with the shaft center axis (32'). The groove (106) of the second embodiment of the lubrication stop is formed in the shaft (12') with an annular interior or inner edge (108) at the bottom of the groove. The groove inner edge (108) is circular, it has a diameter dimension (B) and lies in a plane that is perpendicular to the shaft center axis (32'). On one axial side of the groove (106), the left side of the groove or the side adjacent the shaft first end as shown in FIG. 3, a first radial surface (112) extends from the inner edge (108) of the groove radially outwardly to the shaft outer surface (42'). The first radial surface (112) is perpendicular to the shaft center axis (32') and intersects the shaft outer surface (42') at an annular, right angle corner (114).

At the axially opposite end of the groove (106), the right hand side of the groove or the side closest to the shaft second end as viewed in FIG. 3, a second radial surface (116) extends from the groove inner edge (108) radially outwardly to the shaft outer surface (42'). The second radial surface (116) intersects the first radial surface (112) at the groove annular inner edge (108) and viewed in the plane of FIG. 3, an annular, acute angle corner is formed between the first radial surface (112) and the second radial surface (116). Preferably, the second radial surface (116) is tapered and extends radially outwardly as it extends axially from the annular inner edge (108) at the bottom of the groove to the shaft outer surface (42'). Thus, the intersection of the second radial surface (116) with the shaft outer surface (42') forms an annular, chamfered corner (118) at the intersection.

With the construction of the annular groove (106) described above, the shaft outer surface (42') is parallel with the shaft center axis (32') and the shaft first radial surface (112) is perpendicular to the shaft center axis (32'). The groove second radial surface (116) is conical and tapers radially outwardly as is extends axially from the groove inner edge (108) at the bottom of the groove to the shaft outer surface (42') at the right hand end of the groove.

With the shaft (12') oriented horizontally as it is in the illustrative environment, lubricant leakage along the shaft to the left as viewed in FIG. 3 is stopped by the first radial surface (112) of the groove. Any lubricant that reaches the interior of the groove is thrown radially from the annular, right angle corner (114) of the first radial surface (112) toward the lubricant reservoir of the bearing assembly fibrous material (28) on rotation of the shaft.

Furthermore, the chamfered corner (118) formed by the intersection of the second radial surface (116) with the shaft outer surface (42') will allow component parts of the rotary device, for example, plastic cooling fans, thrust washers or thrust sleeves, to pass over the groove (106) onto the shaft exterior surface to the right of the groove as shown in FIG. 3 with the chamfered corner preventing any damage to the component parts.

Thus, the lubricant leakage stops of the annular grooves constructed in the manner described above overcome the problem of lubricant leakage along the outer surface of a horizontally oriented shaft and the problem of damaging component parts of the electrical device that are press fit over the shaft and the annular groove that were present in the prior art.

Although the lubricant leakage stop of the present invention was described above by reference to a specific embodiments of the invention, it should be understood that other variations and modifications could be made to the lubricant leakage stop without departing from the scope of the invention defined by the following claims.

What is claimed is:

1. A lubricant leakage stop for a rotary device shaft comprising:

a shaft having a center axis of rotation defining mutually perpendicular axial and radial directions relative to the shaft, the shaft having an axial length with opposite first and second ends and an outer surface between the shaft first and second ends;

an annular groove in the shaft outer surface between the shaft first and second ends;

a first radial surface at a side of the groove that is adjacent the shaft first end, the first radial surface intersecting the shaft outer surface at an annular, right angle corner;

a second radial surface at a side of the groove that is adjacent the shaft second end, the second radial surface intersecting the shaft outer surface at an annular, chamfered corner; and, the shaft outer surface having equivalent outer diameter dimensions on axially opposite sides of the right angle corner and the chamfered corner.

2. The stop of claim 1, further comprising:

the shaft having an annular inner surface in the groove, the first radial surface intersecting the inner surface at a right angle and the second radial surface intersecting the inner surface at a right angle.

3. The stop of claim 1, further comprising:

the first radial surface being perpendicular to the shaft center axis and the second radial surface being perpendicular to the shaft center axis.

4. The stop of claim 1, further comprising:

a rotary device housing mounted on the shaft between the groove and the shaft second end, the rotary device housing enclosing a rotary device that is mounted on the shaft for rotation of the shaft by the rotary device.

5. A lubricant leakage stop for a rotary device shaft comprising:
- a shaft having a center axis of rotation defining mutually perpendicular axial and radial directions relative to the shaft, the shaft having an axial length with opposite first and second ends and an outer surface between the shaft first and second ends;
- an annular groove in the shaft outer surface between the shaft first and second ends;
- a first radial surface at a side of the groove that is adjacent the shaft first end, the first radial surface intersecting the shaft outer surface at an annular, right angle corner;
- a second radial surface at a side of the groove that is adjacent the shaft second end, the second radial surface intersecting the shaft outer surface at an annular, chamfered corner; and,
- a source of lubricant leakage positioned relative to the shaft between the groove and the shaft second end.

6. The stop of claim 5, further comprising:
- a pair of bearings mounted on the shaft at axially spaced positions on the shaft, the pair of bearings being mounted on the shaft between the groove and the shaft second end; and
- a rotary device housing mounted on the shaft by the pair of bearings, the rotary device housing enclosing a rotary device between the pair of bearings.

7. A lubricant leakage stop for a rotary device shaft comprising:
- a shaft having a center axis of rotation defining mutually perpendicular axial and radial directions relative to the shaft, the shaft having an axial length with opposite first and second ends and an outer surface between the shaft first and second ends;
- annular groove in the shaft outer surface between the shaft first and second ends;
- a first radial surface at a side of the groove that is adjacent the shaft first end,
- the first radial surface intersecting the shaft outer surface at an annular, right angle corner;
- a second radial surface at a side of the groove that is adjacent the shaft second end, the second radial surface intersecting the shaft outer surface at an annular, chamfered corner; and,
- the shaft having an annular inner surface in the groove with an inner diameter dimension and an annular intermediate surface in the groove with an intermediate diameter dimension, the intermediate diameter dimension being larger than the inner diameter dimension.

8. The stop of claim 7, further comprising:
- the shaft outer surface having an outer diameter dimension that is larger than the intermediate diameter dimension.

9. The stop of claim 7, further comprising:
- the annular inner surface in the groove is one of a pair of annular inner surfaces in the groove having inner diameter dimensions, and the annular intermediate surface is positioned axially between the pair of annular inner surfaces.

10. The stop of claim 9, further comprising:
- a third radial surface and a fourth radial surface in the groove and on axially opposite sides of the annular intermediate surface.

11. The stop of claim 10, further comprising:
- the third radial surface and the fourth radial surface being parallel to each other.

12. The stop of claim 10, further comprising:
- the third radial surface and the fourth radial surface both intersecting the annular intermediate surface at annular, right angle corners.

13. A lubricant leakage stop for a rotary device shaft comprising:
- a shaft having a center axis of rotation defining mutually perpendicular axial and radial directions relative to the shaft, the shaft having an axial length with opposite first and second ends and an outer surface between the shaft first and second ends;
- an annular groove in the shaft outer surface between the shaft first and second ends;
- a first radial surface at a side of the groove that is adjacent the shaft first end, the first radial surface intersecting the shaft outer surface at an annular, right angle corner;
- a second radial surface at a side of the groove that is adjacent the shaft second end, the second radial surface intersecting the shaft outer surface at an annular, chamfered corner; and,
- the second radial surface intersecting the first radial surface at an axially opposite side of the second radial surface from the intersection of the second radial surface and the shaft outer surface.

14. A lubricant leakage stop for a rotary device shaft comprising:
- a shaft having a center axis of rotation defining mutually perpendicular axial and radial directions relative to the shaft, the shaft having an axial length with opposite first and second ends and an outer surface between the shaft first and second ends;
- an annular groove in the shaft outer surface between the shaft first and second ends;
- a first radial surface at a side of the groove that is adjacent the shaft first end, the first radial surface intersecting the shaft outer surface at an annular, right angle corner;
- a second radial surface at a side of the groove that is adjacent the shaft second end, the second radial surface intersecting the shaft outer surface at an annular, chamfered corner; and,
- the second radial surface tapering radially inwardly as the second radial surface extends axially from the intersection with the shaft outer surface toward the first radial surface.

15. A lubricant leakage stop for a rotary device shaft comprising:
- a shaft having a center axis of rotation defining mutually perpendicular axial and radial directions relative to the shaft, the shaft having an axial length with opposite first and second ends and an outer surface between the shaft first and second ends;
- an annular groove in the shaft outer surface between the shaft first and second ends;
- a first radial surface at a side of the groove that is adjacent the shaft first end, the first radial surface intersecting the shaft outer surface at an annular, right angle corner;
- a second radial surface at a side of the groove that is adjacent the shaft second end, the second radial surface intersecting the shaft outer surface at an annular, chamfered corner; and,
- the second radial surface being a conical surface.

16. A lubricant leakage stop for a rotary device shaft comprising:
- a shaft having a center axis of rotation defining mutually perpendicular axial and radial directions relative to the shaft, the shaft having an axial length with opposite first and second ends and an outer surface between the shaft first and second ends;

an annular groove in the shaft outer surface between the shaft first and second ends;

an annular inner surface in the groove with an inner diameter dimension;

an annular intermediate surface in the groove with an intermediate diameter dimension, the intermediate diameter dimension being larger than the inner diameter dimension; and, the shaft outer surface having an outer diameter dimension that is larger than the intermediate diameter dimension.

17. The stop of claim 16, further comprising:

the shaft outer surface having an equivalent outer diameter dimension on axially opposite sides of the groove.

18. The stop of claim 16, further comprising:

a source of lubricant leakage positioned relative to the shaft between the groove and the shaft second end.

19. The stop of claim 16, further comprising:

a pair of bearings mounted on the shaft at axially spaced positions on the shaft, the pair of bearings being mounted on the shaft between the groove and the shaft second end; and a rotary device housing mounted on the shaft by the pair of bearings, the rotary device housing enclosing a rotary device between the pair of bearings.

20. The stop of claim 16, further comprising:

a rotary device housing mounted on the shaft between the groove and the shaft second end, the rotary device housing enclosing a rotary device that is mounted on the shaft for rotation of the shaft by the rotary device.

21. A lubricant leakage stop for a rotary device shaft comprising:

a shaft having a center axis of rotation defining mutually perpendicular axial and radial directions relative to the shaft, the shaft having an axial length with opposite first and second ends and an outer surface between the shaft first and second ends;

an annular groove in the shaft outer surface between the shaft first and second ends;

an annular inner surface in the groove with an inner diameter dimension;

an annular intermediate surface in the groove with an intermediate diameter dimension, the intermediate diameter dimension being larger than the inner diameter dimension;

the shaft outer surface having an outer diameter dimension that is larger than the intermediate diameter dimension; and, the annular inner surface in the groove is one of a pair of annular inner surfaces in the groove having inner diameter dimensions, and the annular intermediate surface is positioned axially between the pair of annular inner surfaces.

22. The stop of claim 21, further comprising:

a pair of radial surfaces on axially opposite sides of the annular intermediate surface, the pair of radial surfaces extending between the annular intermediate surface and the pair of annular inner surfaces.

23. The stop of claim 22, further comprising:

the pair of radial surfaces being parallel to each other.

* * * * *